(12) United States Patent
Mallory

(10) Patent No.: US 6,560,555 B1
(45) Date of Patent: May 6, 2003

(54) METHOD FOR FACILITATING THE FIELD REPLACEMENT OF SENSORS

(75) Inventor: Roy E. Mallory, Bedford, MA (US)

(73) Assignee: ADE Corporation, Westwood, MA (US)

( * ) Notice: Subject to any disclaimer, the term of this patent is extended or adjusted under 35 U.S.C. 154(b) by 351 days.

(21) Appl. No.: 09/624,570

(22) Filed: Jul. 24, 2000

(51) Int. Cl.[7] ............................................... G06F 11/22
(52) U.S. Cl. .......................... 702/109; 702/57; 702/64; 702/85; 702/91; 702/182
(58) Field of Search ............................... 702/57, 64, 65, 702/85, 86, 90, 91, 104, 107, 109–112, 116, 117, 124, 182–185, 188, 194, 189, FOR 103–FOR 104, FOR 106, FOR 134–135, FOR 155–163, FOR 165, FOR 167, FOR 170–171; 340/505, 506, 514, 825.5; 324/615, 612, 614, 76.19, 76.39

(56) References Cited

U.S. PATENT DOCUMENTS

| | | | | | |
|---|---|---|---|---|---|
| 3,808,526 A | * | 4/1974 | Jackson | ..................... | 324/57 R |
| 5,291,140 A | * | 3/1994 | Wagner | ...................... | 324/615 |
| 5,293,556 A | * | 3/1994 | Hill et al. | ............... | 364/551.01 |
| 5,656,932 A | * | 8/1997 | Kitayoshi | .................... | 324/615 |
| 5,675,724 A | * | 10/1997 | Beal et al. | ............. | 395/182.02 |
| 5,680,541 A | * | 10/1997 | Kurosu et al. | ......... | 395/183.02 |
| 5,936,370 A | * | 8/1999 | Fukao et al. | ................. | 318/652 |
| 6,064,694 A | * | 5/2000 | Clark et al. | .................. | 375/224 |
| 6,154,728 A | * | 11/2000 | Sattar et al. | ................... | 705/28 |
| 6,205,408 B1 | * | 3/2001 | Jubin et al. | .................. | 702/182 |
| 6,297,502 B1 | * | 10/2001 | Jarvis et al. | ................. | 250/307 |
| 6,314,546 B1 | * | 11/2001 | Muddu | ........................... | 716/5 |

* cited by examiner

Primary Examiner—Marc S. Hoff
Assistant Examiner—Carol S Tsai
(74) Attorney, Agent, or Firm—Weingarten, Schurgin, Gagnebin & Lebovici LLP

(57) ABSTRACT

A method for facilitating field replacement of sensors is presented. The replacement sensor's transfer function need only be measured, not adjusted, and the signal-processing unit's transfer function need only be adjusted, but not measured, to achieve simple field-replacement of sensors. With this method simple calculations and adjustments, typically expedited by means of a computer program, can be made in the field when sensor replacement is required. By way of the presently disclosed method sensor cost and size are not increased since no normalization techniques or components are required.

12 Claims, 1 Drawing Sheet

METHOD FOR FACILITATING THE FIELD REPLACEMENT OF SENSORS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Applications that require the measurement of various physical quantities are known in the art. Some measurements commonly made are temperature, pressure, and dimensions such as thickness and distance. The systems that make such measurements generally consist of two sub-systems: one or more sensors and a signal-processing unit in electrical communication with the one or more sensors. It is quite common for sensors to need field replacement. To avoid the necessity for complex recalibration procedures that may require specialized equipment and techniques when replacing such sensors, various schemes have been employed. Typically, sensors are factory-normalized so their output conforms to a particular function. When sensors so normalized are connected to signal-processing units that are also factory normalized to expect the particular sensor function, an output of some desired accuracy can be obtained.

In order to normalize sensor outputs, several techniques have been employed; the sensor may be physically adjusted (e.g., laser-trimmed) or have electronic components selected or adjusted. The sensor may contain circuitry for informing the signal-processing unit about its transfer function. For example, it may do so by way of nonvolatile digital memory. Other techniques not specifically mentioned here may be employed.

A disadvantage of such methods is that they require both the sensor and the signal-processing unit to be normalized, or, if the sensor contains circuitry to describe its transfer function to the signal-processing unit, this circuitry must be installed and the signal-processing unit still must be normalized. These methods add cost to the sensor and the signal-processing unit, and may, in addition, add size, weight, or other undesirable constraints upon the sensor design.

BRIEF SUMMARY OF THE INVENTION

A method for facilitating field replacement of sensors is presented. The replacement sensor's transfer function need only be measured, not adjusted, and the signal-processing unit's transfer function need only be adjusted, but not measured, to achieve simple field-replacement of sensors. With this method simple calculations and adjustments, typically expedited by means of a computer program, can be made in the field when sensor replacement is required. By way of the presently disclosed method sensor cost and size are not increased since no normalization techniques or components are required.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
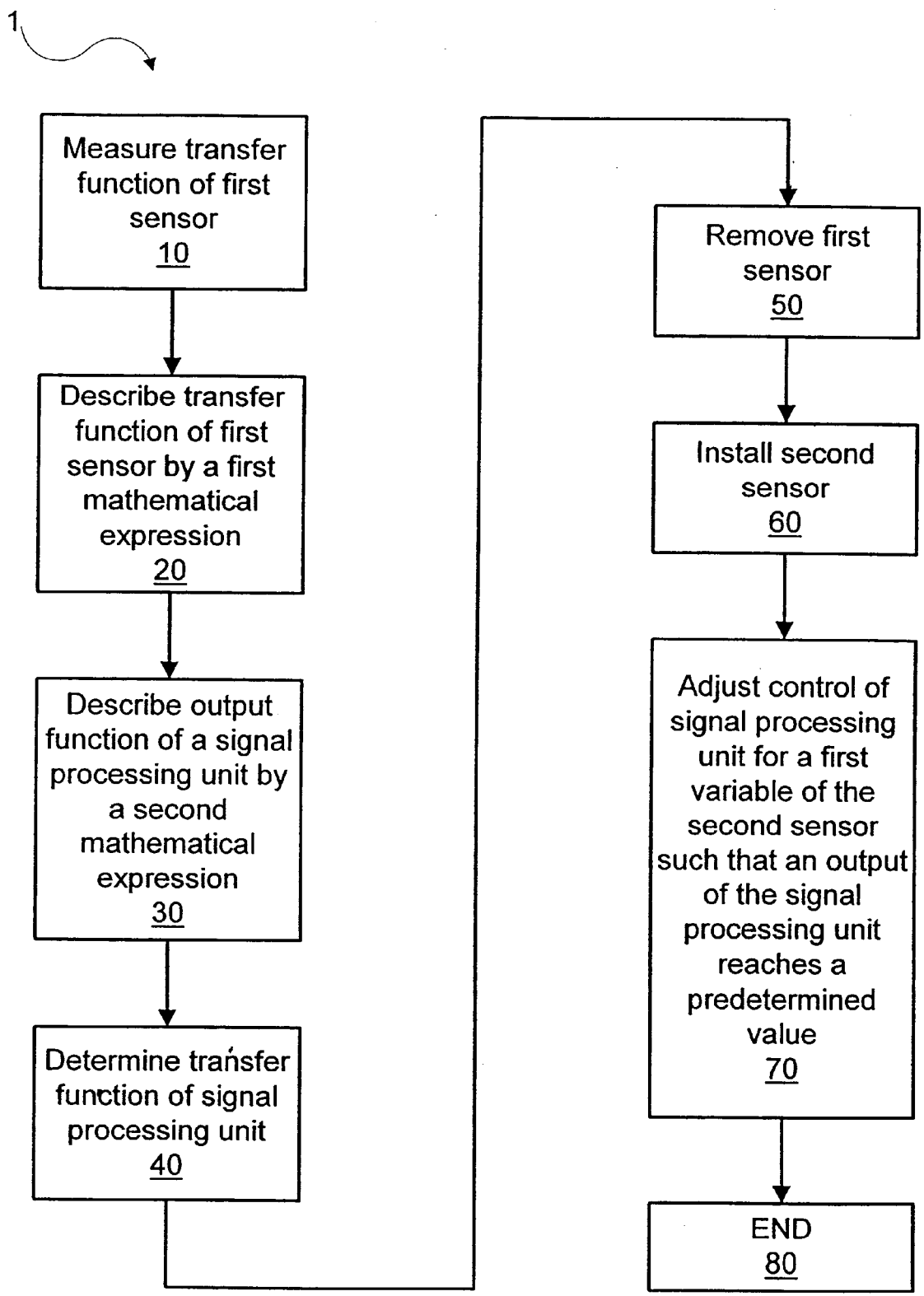
FIG. 1 is a flow chart of the method of the present invention.

A method for facilitating the field replacement of sensors is presented. A particular sensor's transfer function is measured and described by a closed-form mathematical expression. Similarly the output function of the signal-processing unit is also described by a closed-form mathematical expression. From these expressions the transfer function of the signal-processing unit is mathematically determined. In some instances the transfer function of the signal-processing unit is the output function divided by the sensor's function.

The transfer function of the sensor must be able to be fit (usually by the least-squares method) to a mathematical function of some limited number of variables. Thus, the knowledge of the values of those variables, known as the sensor's variables, gives complete knowledge of the sensor's transfer function. For most sensors, the number of variables required is small. The signal-processing unit is able to adjust its transfer function to accommodate the range encountered in the sensor's variables. Therefore, the signal-processing unit contains circuitry for adjusting its transfer function for each of those variables. This circuitry may be physical, such as switches or potentiometers, or may be done through software.

Referring now to FIG. 1, to employ this method for field replacement of sensors, the sensor's variables for the old sensor that is being replaced and the new sensor that is being installed must have been determined. As shown in step 10, the transfer function of the old sensor is measured. At step 20, the transfer function of the old sensor is described by a mathematical expression. The unit is at this point typically started in the field. The output function of the signal-processing unit is also described by a mathematical expression, as recited in step 30. This output function of the signal-processing unit will typically be a quantity such as volts per degree in the case of a temperature measurement system, or volts per distance in the case of a displacement measurement system. When field replacement of the old sensor is required, step 40, the output transfer function of the signal-processing unit is determined.

Step 50 recites the removal of the old sensor. At step 60 the new sensor is installed, and an in-range output is obtained from the signal-processing unit. Next, at step 70, each control of the signal-processing unit that corresponds to each of the sensor's variables is adjusted in order to obtain a particular output from the signal-processing unit. At this point, the signal-processing unit is now correctly adjusted for the new sensor and the replacement operation is completed, as shown in step 80.

Generally, the method comprises determining the defining variables of the old sensor and the new sensor. After installing the new sensor, the signal processing unit's controls that adjust for each respective variable of the new sensor are adjusted untill the output of the signal-processing unit is changed to a calculated value. There is a calculated value for each adjustment.

A specific example involving capacitive displacement sensors is described in detail below. Capacitive displacement gages are well known in the art, and have been used for many years to provide precise measurements of distance and/or distance change. Such units employ a capacitive displacement sensor (henceforth called the probe) whose sensing area is typically placed parallel to the target to be measured. The probe's sensing area forms one plate of a capacitor and the target forms the other plate of the capacitor. The distance from the probe to the target is derived by measuring this capacitance, because, for an ideal parallel-plate capacitor, capacitance and distance are related by the following formula:

$$C = \frac{\varepsilon_0 A}{d} \qquad \text{Equation 1}$$

Where:

C=capacitance in farads $\varepsilon_o$=permittivity of free space in farads/meter A=area of probe's sensing surface in m$^2$ d=distance between plates in meters This equation by itself is usually not sufficient to describe the transfer function of most capacitive sensors. Field fringing or other nonidealities in the probe or signal-processing equipment used with the probe typically cause the lack of conformance to the equation. The response of a typical probe can be adequately modeled by adding a term to this equation. The new equation is:

$$C = \frac{\varepsilon_0 A}{d} + C_0 \qquad \text{Equation 2}$$

Where $C_0$ represents a capacitance in parallel with the probe's sensing capacitance.

In order to measure the output of the probe, the probe's sensor is either driven with a constant voltage, and the AC current through the probe's sensing element is measured, or, more commonly, the probe is driven so its AC current is constant, and the voltage on the probe's sensing element is measured. The voltage, current relationship in a capacitor is:

$$v = \frac{i}{sC} \qquad \text{Equation 3}$$

where "s" is the complex frequency variable. Equation 3 can be simplified since the phase information is not necessary for this determination.

$$v = \frac{i}{C} \qquad \text{Equation 4}$$

Substituting Equation 1 into Equation 4 yields $$v = \frac{id}{\varepsilon_0 A} \qquad \text{Equation 5}$$

Thus, if the current i is kept constant, v is directly proportional to d. The signal-processing unit must be able to compensate for $C_0$ in order to produce an output that is linear in distance. In addition, circuitry is used to drive current through the probe and sense its output voltage. Further, circuitry is used in the signal-processing unit to amplify and condition the probe's output. Equation 5 is modified to include these other variables.

$$v_0 = \frac{k_p k_s d}{\varepsilon_0 A + C_0 d - C_c d} + O$$

where:

$v_o$=the output of the signal-processing unit $k_p$=scale-factor constant of probe $k_s$=scale-factor constant of signal processing unit $C_c$=compensation capacitance A=nominal sensor area O=offset applied by the signal processing unit Equation 6

When $C_c$ is set to be equal to $C_0$ then the distance-related terms in the denominator cancel, and the equation is linear in d. In general, $k_s$, and O are adjusted to obtain a desired output scale factor and offset.

In order to perform field probe replacement by the presently disclosed method, the $k_p$ and $C_0$ must be measured for all probes before shipment to the customer. The output scale factor (sf) and O of the signal-processing unit are set to some specified value. When probes are changed, the new probe is installed and set to obtain an in-range output reading from the signal-processing unit. At this point $k_{p1}$ $p_p$ of old probe $k_{p2}$ $k_p$ of new probe $C_{01}$ $C_0$ of old probe $C_{02}$ $C_0$ of new probe A nominal probe area sf desired output scale-factor of signal-processing unit $V_o$ present output of signal-processing unit O offset applied by signal-processing unit $k_s$ for the processing unit is not known but is calculated as follows:

$$k_{s1} = \frac{sf}{k_{p1}}$$

where $k_{s1}$=$k_s$ as adjusted for the old probe

Equation 7

With the new probe in place and from Equation 6 the signal-processing unit's output is:

$$v_0 = \frac{k_{p2} k_{s1} d}{\varepsilon_0 A + C_{02} d - C_{01} d} + O \qquad \text{Equation 8}$$

$C_{01}$ is substituted for $C_c$ because the signal-processing unit would have been adjusted to have a linear response with the old probe. Equation 8 is rearranged to solve for d as follows:

$$d = \frac{\varepsilon_0 A (v_0 - O)}{k_{s1} k_{p2} - (v_0 - O)(C_{02} - C_{01})} \qquad \text{Equation 9}$$

The output scale-factor (sf) of the processing unit should be the same with the new probe as it was with the old probe. Therefore:

$$sf = k_{s1} k_{p1} = k_{s2} k_{p2} \qquad \text{Equation 10}$$

$$k_{s2} = k_{s1} \frac{k_{p1}}{k_{p2}}$$

If the signal-processing unit's $k_s$ were correct for the new probe, its output $V_{new1}$ would be:

$$v_{new1} = \frac{k_{p2}k_{s1}\frac{k_{p1}}{k_{p2}}d}{\varepsilon_0 A + C_{02}d - C_{01}d} + O \quad \text{Equation 11}$$

Dividing $v_{new1}$ by $v_o$ and solving for $v_{new1}$, yields:

$$v_{new1} = v_0\frac{k_{p1}}{k_{p2}} + O\left(1 - \frac{k_{p1}}{k_{p2}}\right) \quad \text{Equation 12}$$

By way of equation 12, the signal processing unit's scale factor control is adjusted to obtain $v_{new1}$. At this point, the output of the signal-processing unit has the correct scale factor, but the $C_o$ is not properly compensated for as shown below:

$$v_{new1} = \frac{k_{p2}k_{s2}d}{\varepsilon_0 d + C_{02}d - C_{01}d} + O \quad \text{Equation 13}$$

The signal-processing unit's $C_c$ control is adjusted to obtain a new output such that:

$$v_{new2} = \frac{k_{p2}k_{s2}d}{\varepsilon_0 d + C_{02}d - C_{01}\frac{C_{02}}{C_{01}}d} + O \quad \text{Equation 14}$$

The output of the signal-processing unit is now correctly calibrated. Dividing $V_{new2}$ by $v_{new1}$ and solving for $v_{new2}$ results in:

$$v_{new2} = v_{new1}\left(1 + \frac{d(C_{02} - C_{01})}{\varepsilon_0 A}\right) - \frac{Od(C_{02} - C_{01})}{\varepsilon_0 A} \quad \text{Equation 15}$$

Now the signal-processing unit is correctly calibrated so that its transfer function is:

$$v_0 = \frac{k_{p2}k_{s2}d}{\varepsilon_0 A} + O \quad \text{Equation 16}$$

By way of the presently disclosed method, one need only to measure the $k_p$ and Co of every probe before it is shipped. The nominal sensing area (A) of all probes is known. Then, to change probes, the new probe is connected to the signal-processing unit and positioned to obtain an in-range reading from the processing unit. The processing unit's output is first adjusted according to Equation 12, the distance d is calculated by means of Equation 9, and finally the output is adjusted according to Equation 15. At this point, the system (including the new probe) has been correctly calibrated.

It will be appreciated that the entering of the relevant variables ($k_{p1}$, $k_{p2}$, etc.) and the calculations would be greatly simplified by the use of a computer program. This program and the means of adjusting of the signal-processing unit's controls could be automated and reside within the signal-processing unit itself. Alternatively, the program could be run on a separate piece of equipment, and the adjustments could be made manually.

Having described preferred embodiments of the present invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should be limited solely by the scope and spirit of the appended claims.

I claim:

1. A method for facilitating the field replacement of a first sensor of a system with a second sensor comprising the steps of:

providing a system including a signal-processing unit in electrical communication with a first sensor;

measuring a transfer function of said first sensor;

describing the transfer function of said first sensor by a first mathematical expression;

describing the output function of said signal processing unit by a second mathematical expression;

determining a transfer function of said signal processing unit;

removing said first sensor from said system;

installing said second sensor in said system; and adjusting a control of said signal processing unit for a parameter of said second sensor until an output of said signal processing unit is changed to a predetermined value.

2. The method of claim 1 wherein said step of describing the transfer function comprises performing a least squares analysis of said transfer function of said first sensor.

3. The method of claim 1 wherein said step of determining a transfer function comprises dividing the output function of said signal processing unit by the transfer function of said first sensor.

4. The method of claim 1 wherein said first mathematical expression comprises a closed-form mathematical expression.

5. The method of claim 1 wherein said second mathematical expression comprises a closed-form mathematical expression.

6. The method of claim 1 wherein said step of adjusting is performed manually.

7. The method of claim 1 wherein said step of adjusting is performed under software control.

8. The method of claim 1 wherein said system comprises a capacitive displacement measurement system.

9. The method of claim 8 wherein said first sensor comprises a capacitive displacement sensor.

10. The method of claim 8 wherein said second sensor comprises a capacitive displacement sensor.

11. The method of claim 8 wherein said second mathematical expression is in units of volts per distance.

12. The method of claim 1 wherein said system with said second sensor satisfies this relationship $$v_0 = \frac{k_{p2}k_{s2}d}{\varepsilon_0 A} + O$$

where $V_o$ is an output voltage of said signal processing unit;

$k_{p2}$ is a scale factor constant of said second probe;

$k_{s2}$ is a scale factor constant of said signal processing unit with said second probe in electrical communication thereto;

d is distance being probed;

A is nominal probe area $\epsilon_o$ is admittance; and

O is an offset of said signal processing unit.

* * * * *

UNITED STATES PATENT AND TRADEMARK OFFICE
CERTIFICATE OF CORRECTION

PATENT NO.    : 6,560,555 B1
DATED         : May 6, 2003
INVENTOR(S)   : Roy E. Mallory It is certified that error appears in the above-identified patent and that said Letters Patent is hereby corrected as shown below:

<u>Column 2,</u>
Line 57, "untill" should read -- until --; and

<u>Column 4,</u>
Line 22, "$p_p$" should read -- $k_p$ --.

Signed and Sealed this

Twentieth Day of July, 2004

JON W. DUDAS
*Acting Director of the United States Patent and Trademark Office*